(12) United States Patent
Sugiura

(10) Patent No.: US 8,506,692 B2
(45) Date of Patent: Aug. 13, 2013

(54) VALVES CAPABLE OF CONTROLLING VALVE-OPENING AREA

(75) Inventor: Masahiro Sugiura, Anjo (JP)

(73) Assignee: Asian Kogyo Kabushiki Kaisha, Obu-shi, Aichi-ken ( * ) Notice: Subject to any disclaimer, the term of this patent is extended or adjusted under 35 U.S.C. 154(b) by 165 days.

(21) Appl. No.: 13/118,653

(22) Filed: May 31, 2011

(65) Prior Publication Data

US 2011/0296997 A1 Dec. 8, 2011

(30) Foreign Application Priority Data

Jun. 4, 2010 (JP) ................................. 2010-128689

(51) Int. Cl.
*F16K 31/06* (2006.01)
*F02M 25/08* (2006.01)

(52) U.S. Cl.
USPC ............. 96/147; 123/519; 137/629; 137/630; 137/630.15

(58) Field of Classification Search
USPC ............. 95/146; 96/108, 147; 123/518–521; 137/511, 512, 512.3, 516.25, 628–630, 630.15
See application file for complete search history.

(56) References Cited

U.S. PATENT DOCUMENTS

| | | | | |
|---|---|---|---|---|
| 3,756,283 A | * | 9/1973 | Angelery ................. | 137/630.15 |
| 4,700,683 A | * | 10/1987 | Uranishi et al. ............. | 123/519 |
| 5,669,413 A | * | 9/1997 | Hegglin et al. ............. | 137/554 |
| 5,848,608 A | * | 12/1998 | Ishigaki ................... | 137/599.16 |
| 5,858,034 A | * | 1/1999 | Shida et al. ............... | 55/313 |
| 6,062,276 A | * | 5/2000 | Benjey et al. ............. | 141/198 |
| 6,612,338 B2 | * | 9/2003 | Weldon et al. ............ | 137/630.19 |

FOREIGN PATENT DOCUMENTS

| | | |
|---|---|---|
| JP | 08-159322 | 6/1996 |
| JP | 2002-004958 | 1/2002 |
| JP | 2002-317707 A | 10/2002 |
| JP | 2002-339812 | 11/2002 |
| JP | 2005-291241 A | 10/2005 |

OTHER PUBLICATIONS

Japanese Office Action corresponding to Japanese Patent Application No. 2010-128689 mailed Jun. 4, 2013, with full English language translation.

* cited by examiner

*Primary Examiner* — Frank Lawrence, Jr.
(74) *Attorney, Agent, or Firm* — Ladas & Parry, LLP

(57) ABSTRACT

A valve includes a valve housing defining therein a fluid passage composed of a first passage and a second passage, a first valve member configured to open and close the fluid passage, a first biasing member pressing the first valve member in a first valve-closing direction along a flow direction from the first passage to the second passage, a second valve member configured to open and close the fluid passage, a second biasing member pressing the second valve member in a second valve-closing direction along the flow direction from the first passage to the second passage, an electromagnetic driving member having an pressing member opening the first valve member and the second valve member in stages, a third valve member configured to open and close the fluid passage, and a third biasing member pressing the third valve member in a third valve-closing direction along a flow direction from the second passage to the first passage. The third valve member is configured to open the fluid passage when internal pressure of the first passage is higher than internal pressure of the second passage by a predetermined value.

7 Claims, 9 Drawing Sheets

VALVES CAPABLE OF CONTROLLING VALVE-OPENING AREA

CROSS-REFERENCES TO RELATED APPLICATIONS

This application claims priority to Japanese patent application serial number 2010-128689, the contents of which are incorporated herein by reference.

BACKGROUND OF THE INVENTION

1. Field of the Invention

This disclosure relates to electric-operated valves and fuel vapor treating systems each having such electric-operated valve.

2. Description of the Related Art

A gas vehicle is equipped with a fuel vapor treating system for preventing fuel vapor vaporized in a fuel tank from flowing into the atmosphere. The fuel vapor treating system includes an adsorbent canister filled with an adsorbent and temporarily trapping the fuel vapor by removably adsorbing the fuel vapor onto the adsorbent. The fuel vapor treating system has valves, each of which is generally composed of an electromagnetic valve, for opening and closing pipes communicating the fuel tank, the canister and the atmosphere each other in order to control flow of the fuel vapor in the fuel vapor treating system.

Japanese Laid-Open Patent Publication No. 2005-291241 discloses a conventional electromagnetic valve having a first valve member and a second valve member. FIG. 13 is a cross-sectional view showing a main part of the electromagnetic valve. FIG. 14 is a cross-sectional view showing the main part where the first valve member is open. FIG. 15 is a cross-sectional view showing the main part where the second valve member is open. As shown in FIG. 13, the electromagnetic valve 210 has the first valve member 250, the second valve member 270, a second valve seat 217 and an electromagnetic driving member (not shown), and defines a first passage 300 and a second passage 302 therein. The first valve member 250 is reciprocated in an axial direction (horizontal direction in FIG. 13). The second valve member 270 has a first valve seat 276 and defines a communication pathway 272 therein such that the communication pathway 272 communicates the first passage 300 and the second passage 302 with each other. When the first valve member 250 contacts the first valve seat 276 of the second valve member 270, the communication pathway 272 is closed. The second valve seat 270 is configured to fit the second valve seat 217. In addition, the second valve member 270 is biased in a valve-opening direction (leftward direction in FIG. 13) due to a spring 278.

When the first valve member 250 contacts the first valve seat 276 and the second valve member 270 contacts the second valve seat 217, communication between the first passage 300 and the second passage 302 is blocked (FIG. 13). When the electromagnetic driving member moves the first valve member 250 away from the first valve seat 276 while the second valve member 270 is contacting the second valve seat 217, the first passage 300 and the second passage 302 are communicated with each other via the communication pathway 272 (FIG. 14). Thus, fluid (fuel vapor) can flow from the first passage 300 through the communication pathway 272 to the second passage 302. In this state, when differential pressure between internal pressure of the first passage 300 and that of the second passage 302 decreases, the spring 278 moves the second valve member 270 away from the second valve seat 217 (FIG. 15). Accordingly, because an opening area (passage area) increases, i.e., the fluid can flow through a space between the second valve member 270 and the second valve seat 217 in addition to the communication pathway 272, it is able to increase a flow rate of the fluid flowing from the first passage 300 to the second passage 302.

As for this electromagnetic valve 210, in the condition that the first valve member 250 is kept away from the first valve seat 276 (FIG. 14), when a pressing force provided by the differential pressure between the internal pressure of the first passage 300 and the second passage 302 and acting on the second valve member 270 is greater than a spring force of the spring 278, the second valve member 270 is kept in contact with the second valve member 217. On the other hand, when the pressing force is lower than the spring force of the spring 278, the second valve member 270 is displaced away from the second valve seat 217 due to action of the spring.

In addition, in the condition that the first valve member 250 and the second valve member 270 contact the first valve seat 276 and the second valve seat 217, respectively (FIG. 13), when the internal pressure of the first passage 300 becomes higher or lower than the internal pressure of the second passage 302 by more than a predetermined value, it is not able to control the differential pressure between the internal pressures of the first passage 300 and the second passage 302 within a predetermined range. Therefore, it is necessary to define a bypass pathway for bypassing the electromagnetic valve 210 and to provide a relief valve in the bypass pathway in order to control the pressure difference between the internal pressures of the first passage 300 and the second passage 302 within the predetermined range. Thus, there has been need for improved valves.

SUMMARY OF THE INVENTION

One aspect of this disclosure includes a valve including a valve housing defining a fluid passage composed of a first passage and a second passage, a first valve member configured to open and close the fluid passage, a first biasing member pressing the first valve member in a first valve-closing direction along a flow direction from the first passage to the second passage, a second valve member configured to open and close the fluid passage, a second biasing member pressing the second valve member in a second valve-closing direction along the flow direction from the first passage to the second passage, an electromagnetic driving member having an pressing member opening the first valve member and the second valve member in stages, a third valve member configured to open and close the fluid passage, and a third biasing member pressing the third valve member in a third valve-closing direction along a flow direction from the second passage to the first passage. The third valve member is configured to open the fluid passage when internal pressure of the first passage is higher than internal pressure of the second passage by a predetermined value.

In accordance with this aspect, it is able to improve control accuracy of the flow rate. And, when the internal pressure of the first passage is higher than the internal pressure of the second passage by more than the predetermined value, the third valve member is opened against a pressing force by the third biasing member, so that it is able to control the differential pressure between the internal pressures of the first passage and the second passage below the predetermined value.

DETAILED DESCRIPTION OF THE PREFERRED EMBODIMENTS

Each of the additional features and teachings disclosed above and below may be utilized separately or in conjunction with other features and teachings to provide improved valves. Representative examples, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
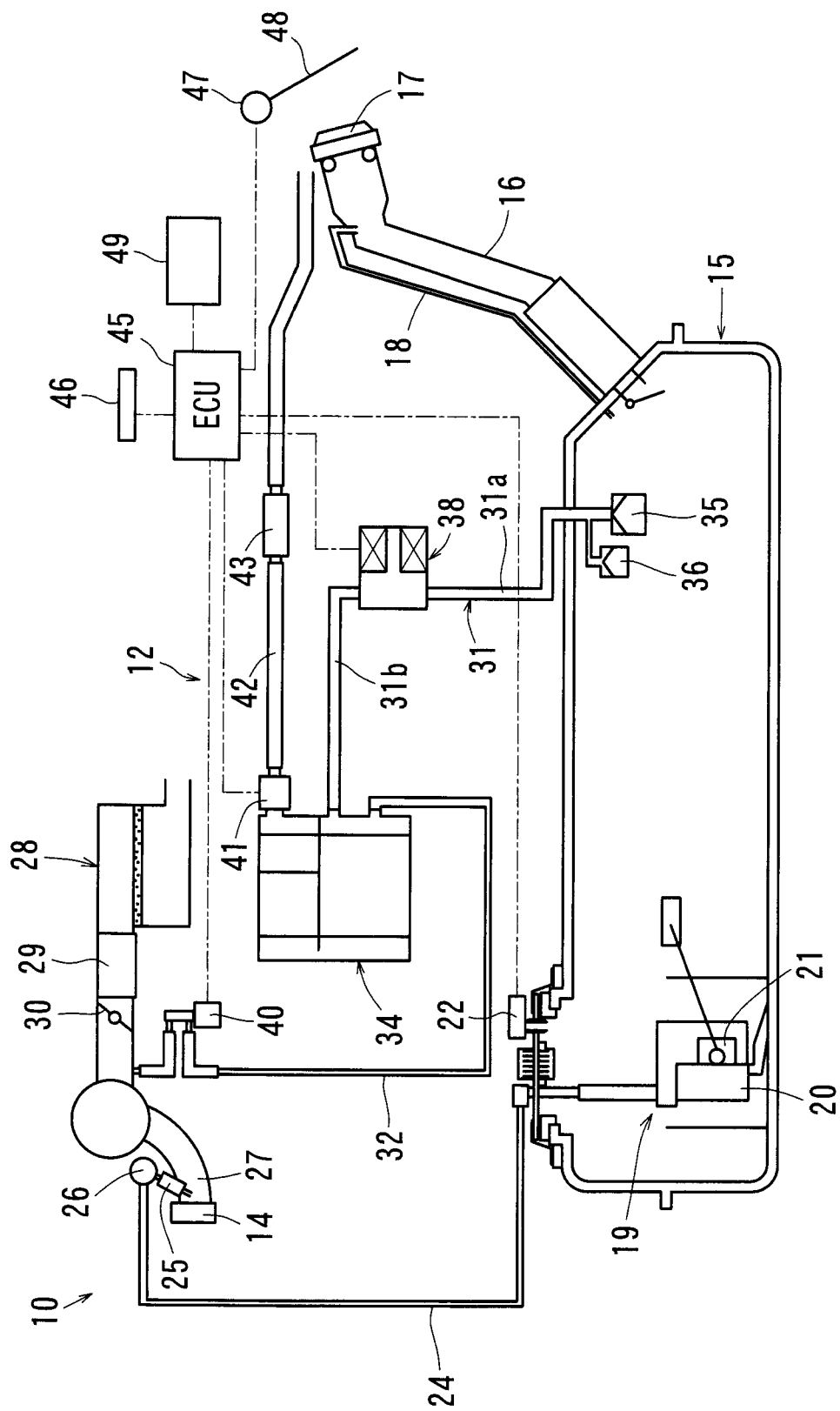
FIG. 1 is a schematic view of a fuel vapor treating system in a first embodiment.

A first embodiment of this disclosure will be described. For convenience of explanation, a fuel vapor treating system for an engine (internal combustion engine) will be described at first, and then a flow control valve included in the fuel vapor treating system will be described. FIG. 1 is a schematic view of the fuel vapor treating system. As shown in FIG. 1, an engine system 10 for automobile such as gasoline vehicle is provided with a fuel vapor treating system 12. The engine system 10 has an engine 14, and a fuel tank 15 for reserving fuel that is provided to the engine 14. The fuel tank 15 is provided with an inlet pipe 16 having a fin opening at its upper end. The inlet pipe 16 transports fuel from the fill opening into the fuel tank 15. The fill opening of the inlet pipe 16 is closed with a removable tank cap 17. The upper end of the inlet pipe 16 is communicated with an upper section (corresponding to a gaseous layer) of the fuel tank 15 via a breather-pipe 18.

Inside of the fuel tank 15, a fuel supply device 19 is provided. The fuel supply device 19 has a fuel pump 20, a sender gage 21 and an internal pressure sensor 22, etc. The fuel pump 20 suctions the fuel reserved in the fuel tank 15, applies pressure on the fuel and then discharges it. The sender gage 21 measures a liquid level of the fuel. The internal pressure sensor 22 measures internal pressure of the fuel tank 15, which is detected as relative pressure to the atmospheric pressure. The fuel pump 20 pumps the fuel from the fuel tank 15 through a fuel supply pipe 24 into the engine 14, in particular, into a delivery pipe 26 having injectors (fuel injection valves) 25, each of which is provided for each combustion chamber. And then, the fuel is injected from the injectors 25 into each air intake pipe 27. The air intake pipe 27 is provided with an air cleaner 28, an airflow meter 29, a throttle valve 30 and the like.

The fuel vapor treating system 12 has a fuel vapor pipe 31, a purge pipe 32 and a canister 34. The fuel vapor pipe 31 has one end (at upstream side) communicated with the gaseous layer in the fuel tank 15 and the other end (at downstream side) connected to the canister 34. The purge pipe 32 has one end (at upstream side) connected to the canister 34 and the other end (at downstream side) connected to the air intake pipe 27 downstream of the throttle valve 30. The canister 34 is filled with an adsorbent composed of activated carbon. The fuel vapor vaporized in the fuel tank 15 flows through the fuel vapor pipe 31 into the canister 34 and adsorbs onto the adsorbent (activated carbon) in the canister 34. In the upper section of the fuel tank 15 for the gaseous layer, the upstream end of the fuel vapor pipe 31 is provided with a fuel cut-off valve 35 and an ORVR valve (on board refueling vapor recovery valve) 36.

The fuel vapor pipe 31 has a flow control valve 38. In particular, the fuel vapor pipe 31 is divided into a first section 31a near the fuel tank 15 and a second section 31b near the canister 34, and the first section 31a and the second section 31b are communicated with each other via the flow control valve 38. The purge pipe 32 is provided with a purge valve 40. The canister 34 is communicated with an air pipe 42 via a switching valve 41. The air pipe 42 has the other end communicating with the atmosphere. The air pipe 42 is provided with an air filter 43. Each of the flow control valve 38, the purge valve 40 and the switching valve 41 is composed of an electromagnetic valve or an electric-operated valve such that the flow control valve 38, the purge valve 40 and the switching valve 41 are opened and closed depending on signals output from an engine control unit (ECU) 45. The flow control valve 38 will be described below in detail.

The ECU 45 is connected with a lid switch 46, a lid opener 47 and a display 49 in addition to the internal pressure sensor 22, the flow control valve 38, the purge valve 40 and the switching valve 41. The lid opener 47 is connected with a manually-operated lid opening and closing device (not shown) for manually opening and closing a lid 48 covering the fill opening. The lid opener 47 is a lock system for the lid 48, which unlocks the lid 48 when the lid opener 47 receives lid opening signals from the ECU 45 or when the manually-operated lid opening and closing device is operated in order to open the lid 48. The lid switch 46 outputs signals for unlocking the lid 48 to the ECU 45.

Then, basic mechanism of the fuel vapor treating system 12 will be described.

(1) During Parking

When the vehicle is parked, the flow control valve 38 is kept in a closed state. Thus, the fuel vapor vaporized in the fuel tank 15 does not flow into the canister 34. In addition, air in the canister 34 does not flow into the fuel tank 15. In this state, the purge valve 40 and the switching valve 41 are also closed.

(2) During Driving

When requirements for purge are met while the vehicle is moving, the ECU 45 outputs signals for purging the fuel vapor trapped in the canister 34. Due to the signals, while the switching valve 41 is opened for communicating the canister 34 with the atmosphere through the air pipe 42, the purge valve 40 is opened and closed. When the purge valve 40 is opened, the engine 14 is communicated with the canister 34 via the purge pipe 32. Because internal pressure of the engine 14 is lower than that of the canister 34, the fuel vapor in the canister 34 flows into the engine 14 via the air intake pipe 27 together with air suctioned from the air pipe 42, and then is burned in the engine 14. The ECU 45 keeps the flow control valve 38 in the open state during purge of the fuel vapor. Therefore, the internal pressure in the fuel tank 15 is kept to a predetermined value close to the atmospheric pressure.

(3) During Refueling

When the lid switch 46 is operated during parking, the ECU 45 outputs a signal in order to open the flow control valve 38. At that time, in a case that the internal pressure of the fuel tank 15 is higher than the atmospheric pressure, the fuel vapor flows into the canister 34 through the fuel vapor pipe 31 as soon as the flow control valve 38 is opened, and then the fuel vapor is adsorbed on the adsorbent in the canister 34. In this way, it is able to prevent the fuel vapor from releasing into the atmosphere. This leads decrease in the internal pressure of the fuel tank 15 to the predetermined value close to the atmospheric pressure. When the internal pressure of the fuel tank 15 decreases to the predetermined value close to the atmospheric pressure, the ECU 45 outputs a signal for unlocking the lid 48 to the lid opener 47. The lid opener 47 receives the signal and unlocks the lid 48 such that the lid 48 can be opened. Then, after the lid 48 is opened and the tank cap 17 is removed, the fuel tank 15 is refueled. Here, because the tank cap 17 is removed after the internal pressure of the fuel tank 15 decreases to the predetermined value close to the atmospheric pressure, it is able to prevent the fuel vapor from releasing into the atmosphere through the fill opening. In addition, the ECU 45 keeps the flow control valve 38 open until the refueling is over, in particular, the lid 48 is closed. Thus, the fuel vapor in the fuel tank 15 flows through the fuel vapor pipe 31 into the canister 34 and is trapped on the adsorbent in the canister 34 during refueling.

Figure 2:
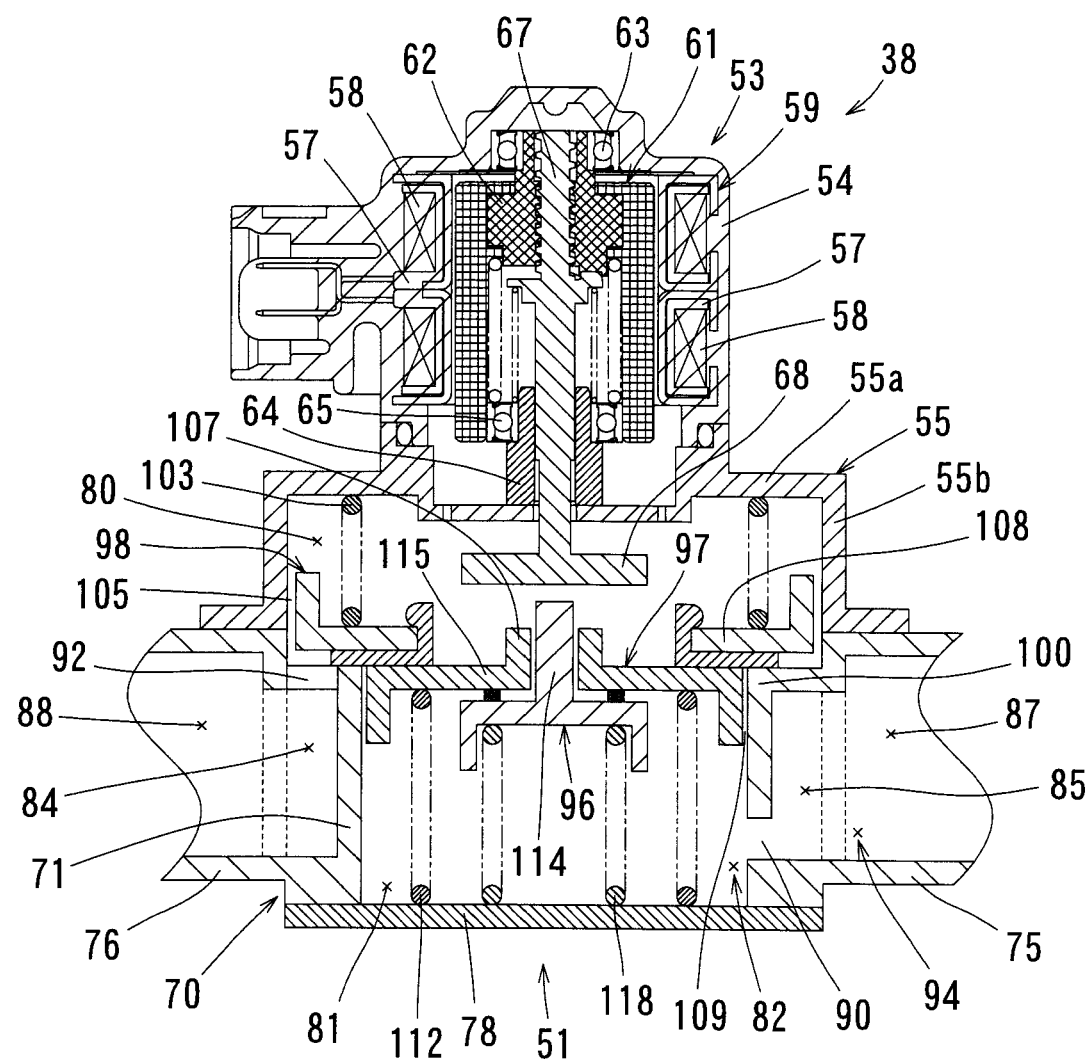
FIG. 2 is a cross-sectional view of a flow control valve.

Then, the flow control valve 38 will be described in detail. FIG. 2 is a cross-sectional view showing the flow control valve 38. For convenience of explanation, each directions, i.e., upper, lower, left and right directions, are defined based on the cross-sectional view of FIG. 2. As shown FIG. 2, the flow control valve 38 has a valve mechanical part 51 and a step motor 53 for activating the valve mechanical part 51. Here, the valve mechanical part 51 will be described after explanation of the step motor 53.

The step motor 53 is also called as stepper motor or stepping motor and has a motor housing 54 with a lower open end. The lower opening of the motor housing 54 is closed with a connection housing 55 formed in a hollow cylinder shape having a closed top end. The motor housing 54 and the connection housing 55 are concentrically engaged with each other. The motor housing 54 is provided therein with a stator 59 composed of a bobbin 57, an excitation coil 58 around the bobbin 57, and a hollow cylinder shaped rotor 61. The rotor 61 is rotatably supported in the motor housing 54 such that the rotor 61 can rotate about a vertical axis at a predetermined height in the motor housing 54. On an outer circumference of the rotor 61, permanent magnets are attached. A nut 62 is concentrically integrated with an upper section of the rotor 61, and has an upper part rotatably supported by the motor housing 54 via a bearing 63. The rotor 61 has a lower section rotatabley supported by an upper part of a cylinder shaped bearing base 64 via a bearing 65. The bearing base 64 is concentrically fixed on an upper wall 55a of the connection housing 55.

The nut 62 is threadaby engaged with an upper end of a press shaft 67 corresponding to output shaft of the step motor 53. A lower part of the press shaft 67 is inserted into and supported by the bearing base 64 such that the press shaft 67 can move in the vertical direction and cannot rotate about the vertical axis. Thus, when the rotor 61 rotates, the press shaft 67 moves upwardly or downwardly depending on rotational direction of the rotor 61. The lower part of the press shaft 67 passes through the upper wall 55a of the connection housing 55. The press shaft 67 has a circular-plate shaped press plate 68 formed as flange at its lower end. The step motor 53 is controlled by the ECU 45. Here, the step motor 53 and the press plate 68 correspond to "electromagnetic driving member" and "pressing member", respectively.

Figure 3:
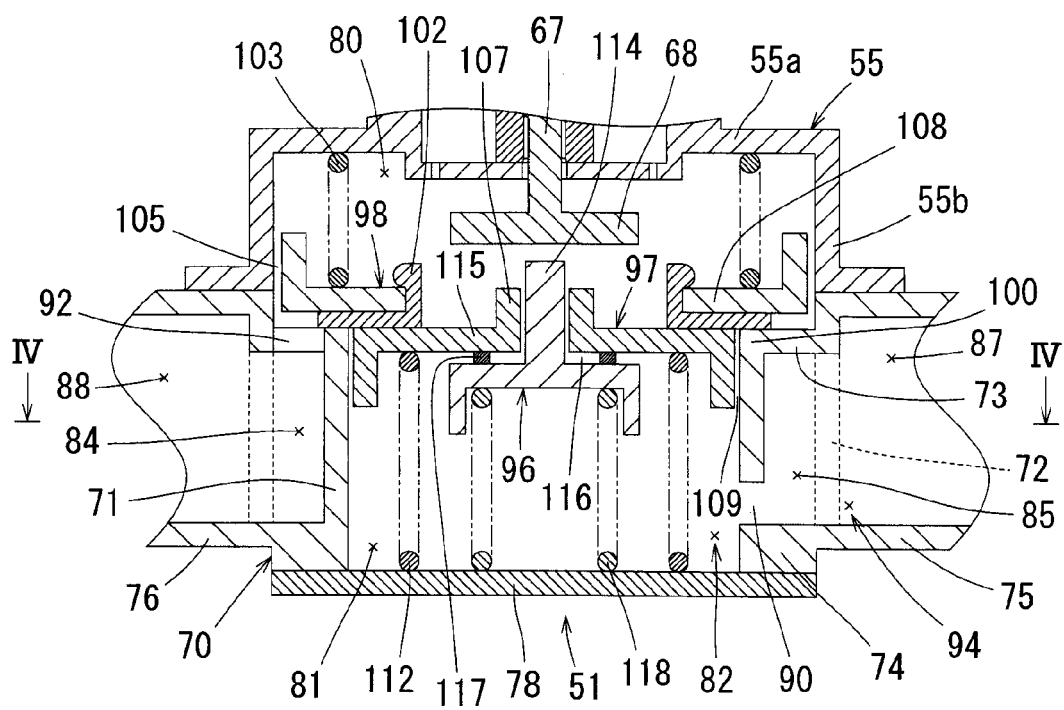
FIG. 3 is a cross-sectional view of a valve mechanical part.
Figure 4:
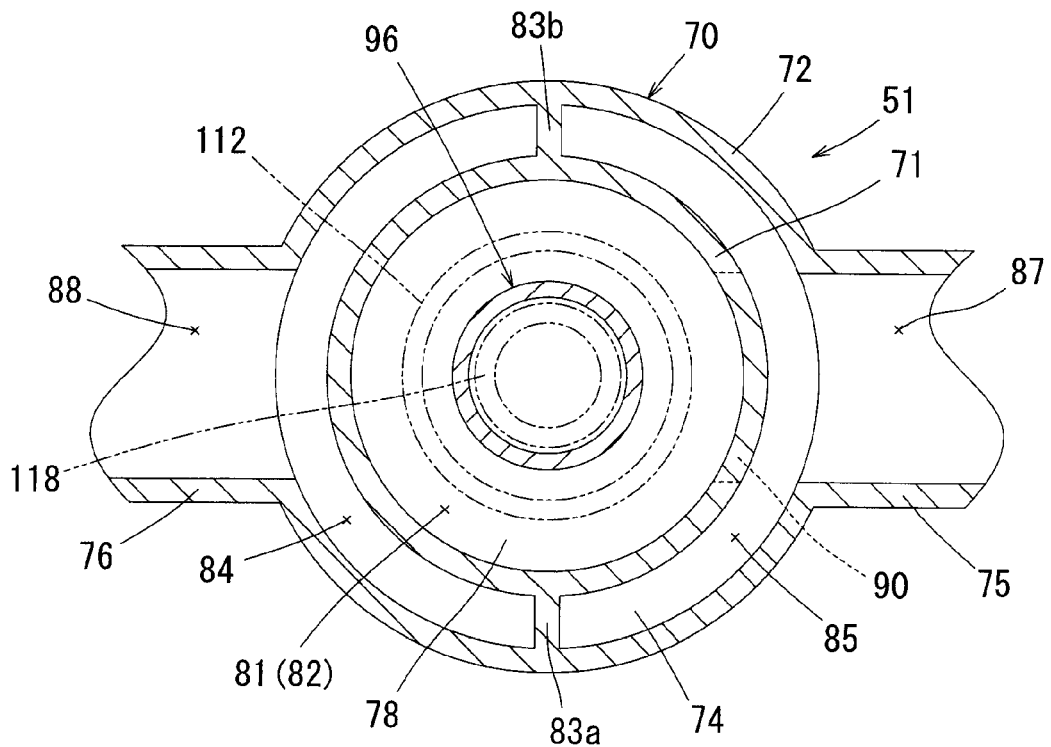
FIG. 4 is a cross-sectional view along line IV-IV in FIG. 3.

Then, the valve mechanical part 51 will be described. FIG. 3 is a cross-sectional view of the valve mechanical part 51. FIG. 4 is a cross-sectional view along line IV-IV in FIG. 3. As shown in FIG. 3, the valve mechanical part 51 has a valve housing 70 concentrically engaged with a lower end of a circumference wall 55b of the connection housing 55. The valve housing 70 has an inner cylinder 71, an outer cylinder 72, an upper ring-shaped wall 73, a lower ring-shaped wall 74, a first connecting tube 75 and a second connecting tube 76. The inner cylinder 71 and the outer cylinder 72 are configured as double cylinder such that the inner cylinder 71, the outer cylinder 72 and the connection housing 55 are positioned concentrically (FIG. 4).

As shown in FIG. 3, the upper ring-shaped wall 73 is engaged with upper ends of the inner cylinder 71 and the outer cylinder 72. The lower ring-shaped wall 74 is engaged with lower ends of the inner cylinder 71 and the outer cylinder 72. The first connecting tube 75 is connected to a right side of the outer cylinder 72. The second connecting tube 76 is connected to a left side of the outer cylinder 72. A lower opening of the valve housing 70 (in particular, the inner cylinder 71) is closed with a bottom plate 78. In addition, an inner space 80 of the connection housing 55 and an inner space 81 of the inner cylinder 71 are communicated with each other and form a valve chamber 82.

As shown in FIG. 4, the space between the inner cylinder 71 and the outer cylinder 72 is divided into a left space 84 and a right space 85 by partitions 83a, 83b. The first connecting tube 75 defines therein a first passage 87 communicating with the right space 85. The second connecting tube 76 defines therein a second passage 88 communicating with the left space 84. The inner cylinder 71 has an opening 90 at its lower right end in order to communicate the inner space 81 of the inner cylinder 71 (called as "inner space 81 of valve housing 70" hereafter) with the first passage 87 (FIG. 3).

As show in FIG. 3, the upper ring-shaped wall 73 defines an opening 92 on its left side in order to communicate the inner space 80 of the connection housing 55 with the left space 84. Here, the first passage 87, the right space 85, the opening 90, the valve chamber 82 (the inner space 80 of the connection housing 55 and the inner space 81 of the valve housing 70), the opening 92, the left space 84 and the second passage 88 form a fluid passage 94.

In the valve chamber 82, a first valve member 96, a second valve member 97 and a third valve member 98 are provided. The third valve member 98, the second valve member 97 and the first valve member 96 will be described sequentially. The third valve member 98 is formed in a ring-plate shape and is concentrically disposed in the valve chamber 82, in particular, in the inner space 80 of the connection housing 55 such that the third valve member 98 can move in the vertical direction. The upper end of the inner cylinder 71 of the valve housing 70 (an inner circumference portion of the upper ring-shaped wall 73) is configured as a third valve seat 100 such that the third valve member 98 can fit the third valve seat 100, i.e., a third valve is composed of the third valve member 98 and the third valve seat 100.

Figure 7:
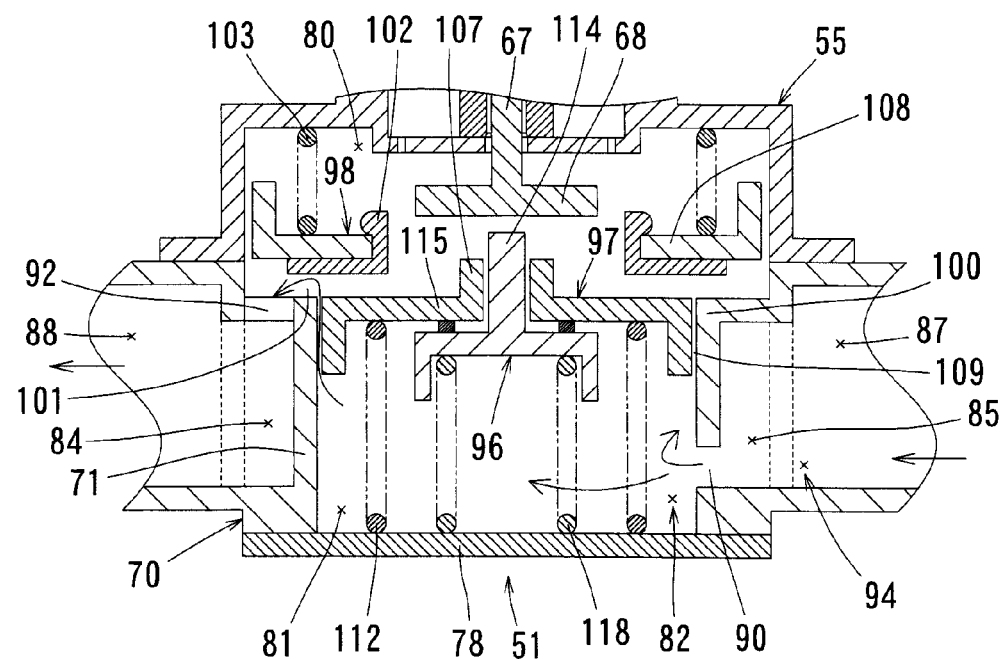
FIG. 7 is a cross-sectional view of the valve mechanical part where a third valve member opened due to differential pressure between internal pressures of a first passage and a second passage.

When the third valve member 98 does not contact the third valve seat 100 (i.e., the third valve is open), a third communication passage 101 defined between the third valve member 98 and the third valve seat 100 is opened (FIG. 7). The third communication passage 101 communicates a radially inner space with a radially outer space in the inner space 80 of the connection housing 55n and the third valve member 98 is configured to open and close the third communication passage 101. The third valve member 98 is provided with a ring-shaped seal member 102 covering a lower surface and an inner side surface of the third valve member 98 (FIG. 3). When the third valve member 98 contacts the third valve seat 100 (i.e., the third valve is closed), the seal member 102 of the third valve member 98 elastically contacts the third valve seat 100 such that the third communication passage 101 is tightly closed.

A third spring 103 that is a coil spring is disposed between the third valve member 98 and the upper wall 55a of the connection housing 55 along the vertical direction. The third spring 103 biases the third valve member 98 downwardly, i.e., in a third valve-closing direction. Here, the third spring 103 corresponds to "third biasing member" herein. In addition, a third flow passage 105 is defined between the third valve member 98 and the circumference wall 55b of the connection housing 55. The third valve member 98 divides the inner space 80 of the connection housing 55 into an upper area and a lower area, and the third flow passage 105 communicates the upper area and the lower area with each other in the vertical direction.

The second valve member 97 is formed in a circular plate shape and is concentrically disposed in the inner space 81 of the valve housing 70 such that the second valve member 97 can move in the vertical direction. The second valve member 97 concentrically has a second protruding shaft 107 at its center part. The second protruding shaft 107 is formed in a hollow cylinder shape and extends from the center part upwardly in the vertical direction. A radially inner part of the third valve member 98 is configured as a second valve seat 108 such that the second valve member 97 fits the second valve seat 108 (i.e., a second valve is composed of the second valve member 97 and the second valve seat 108). The second valve member 97 and the inner cylinder 71 of the valve housing 70 define a second flow passage 109 therebetween. The second valve member 97 divides the inner space 81 of the valve housing 70 into an upper area and a lower area, and the second flow passage 109 communicates the upper area and the lower area of the inner space 81 with each other in the vertical direction.

Figure 6:
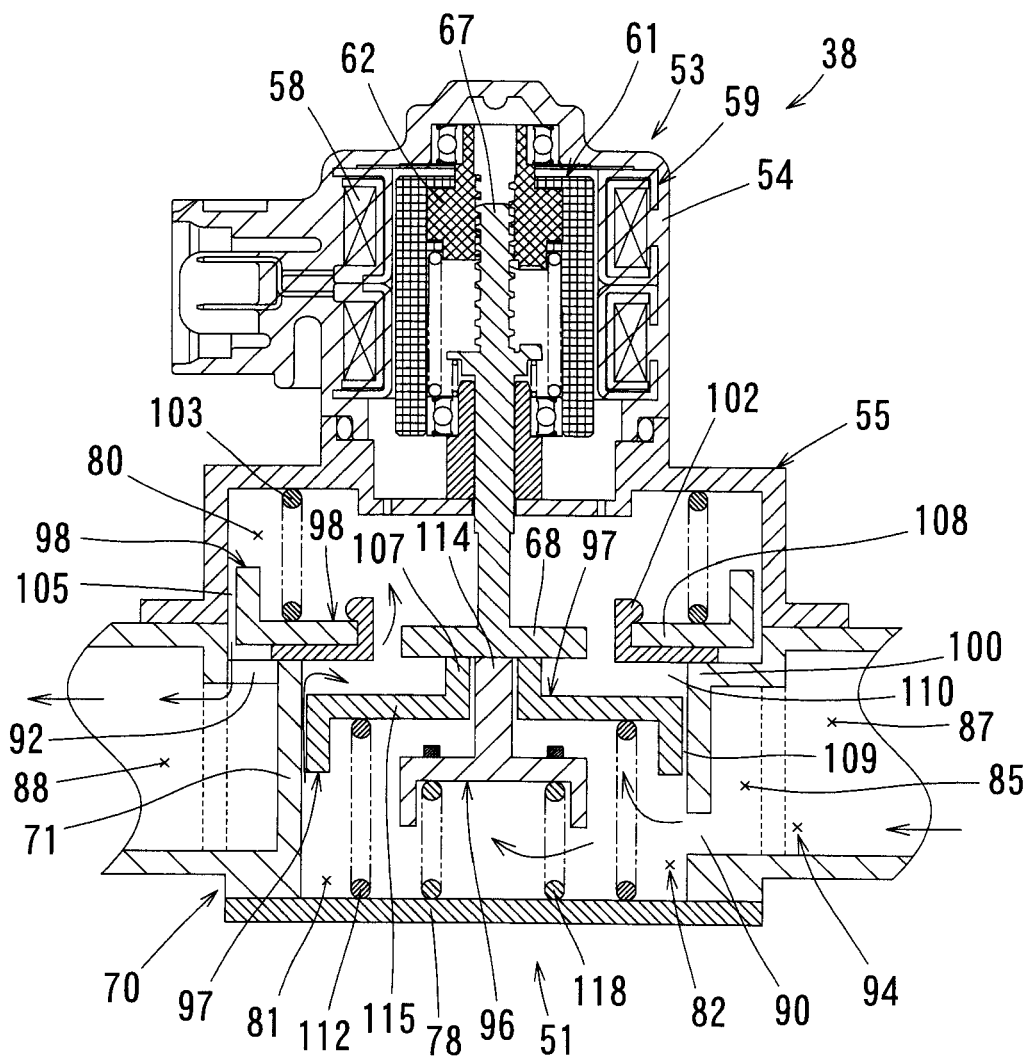
FIG. 6 is a cross-sectional view of the valve control valve where a second valve member is; open.

When the second valve member 97 does not contact the second valve seat 108 (i.e., the second valve is open), a second communication passage 110 defined between the second valve member 97 and the third valve member 98 (including the seal member 102) is opened (FIG. 6).

The second communication passage 110 is opened and closed by the second valve member 97 and is connected with the second flow passage 109 such that the inner space 81 of the valve housing 70 is communicated with the inner space 80 of the connection housing 55 via the second communication passage 110.

As shown in FIG. 3, when the second valve member 97 contacts the second valve seat 108 (i.e., the second valve is closed), a radially inner part of the seal member 102 of the third valve member 98 elastically contacts the second valve member 97 such that the second communication passage 110 is tightly closed. A second spring 112 that is a coil spring is disposed between the second valve member 97 and the bottom plate 78 along the vertical direction. The second spring 112 biases the second valve member 97 upwardly, i.e., in a second valve-closing direction. The second spring 112 corresponds to "second, biasing member" herein.

Figure 5:
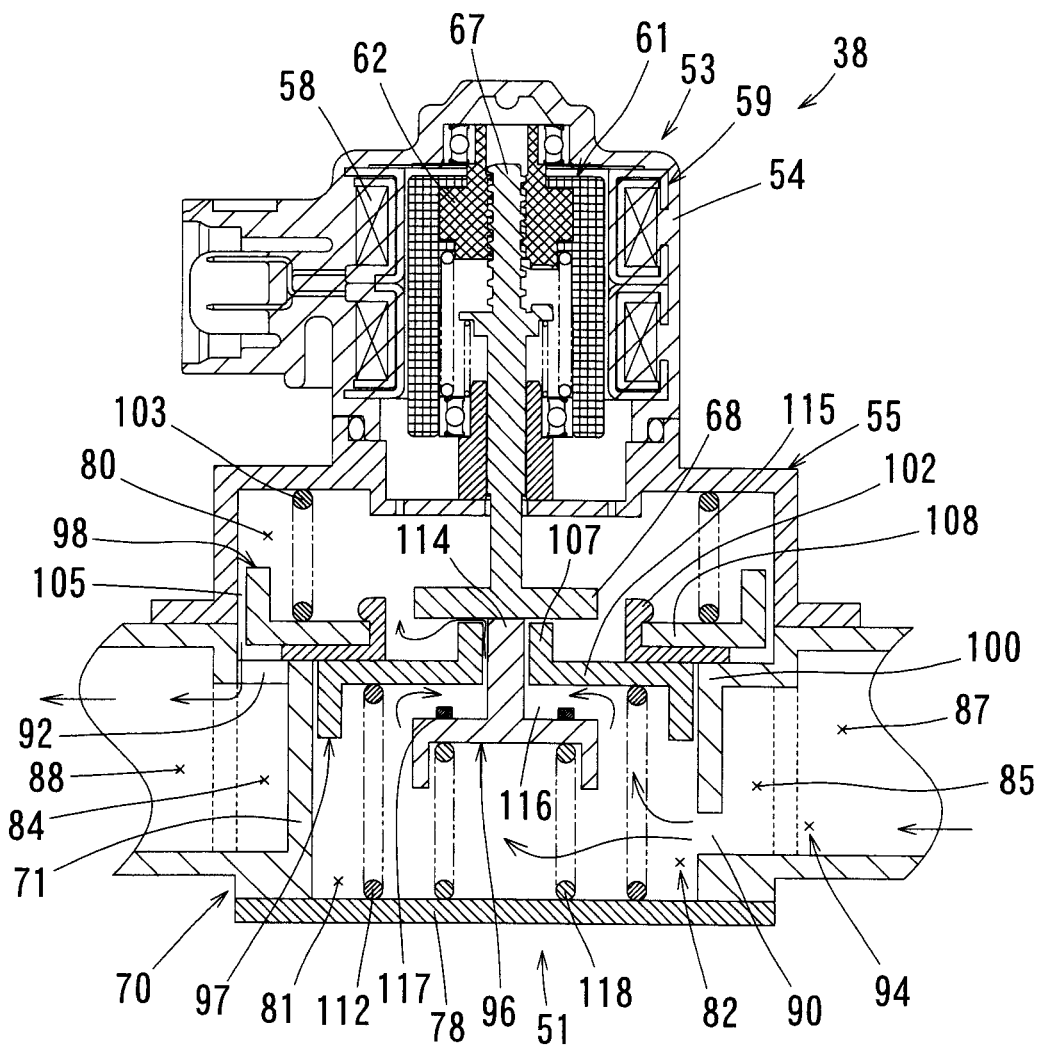
FIG. 5 is a cross-sectional view of the flow control valve where a first valve member is open.

The first valve member 96 is formed in a circular plate shape smaller than the second valve member 97 and is concentrically disposed below the second valve member 97 such that the first valve member 96 can move in the vertical direction. The first valve member 96 has a first protruding shaft 114 formed in a solid cylinder shape at its center region. The first protruding shaft 114 concentrically extends from the center region of the first valve member 96 upwardly and is loosely fitted into the second protruding shaft 107 of the second valve member 97 such that the first protruding shaft 114 can move in the vertical direction relative to the second protruding shaft 107. A radially inner part of the second valve member 97 is configured as a first valve seat 115 for the first valve member 96 such that the first valve member 96 fits the first valve seat 115; i.e., a first valve is composed of the first valve member 96 and the first valve seat 115. When the first valve member 96 does not contact the first valve seat 115 (i.e., the first valve is open), a first communication passage 116 defined between the first valve member 96 and the second valve member 97 is opened (FIG. 5). The first communication passage 116 communicates the inner space 81 of the valve housing 70 with the inner space 80 of the connection housing 55 and is opened and closed by the first valve member 96.

As shown in FIG. 3, a ring-shaped first seal member 117 is concentrically provided on an upper surface of the first valve member 96. When the first valve member 96 contacts the first valve seat 115 (i.e., the first valve is closed), the first seal member 117 elastically contacts the first valve seat 115 such that the first communication passage 116 between the first valve member 96 and the first valve seat 115 is tightly closed. When the first valve member 96 contacts the first valve seat 115, the first protruding shaft 114 partially protrudes from an upper end of the second protruding shaft 107. When the first valve member 96 and the second valve member 97 contact the first valve seat 115 and the second valve seat 108, respectively (i.e., the first and second valves are closed), the first protruding shaft 114 and the second protruding shaft 107 are positioned away from the press plate 68 of the step motor 53 at predetermined distances. The press plate 68 has an outside diameter that is larger than an outside diameter of the second protruding shaft 107 and is smaller than an inside diameter of the third valve member 98, in particular, an inside diameter of the seal member 102.

A first spring 118 that is a coil spring is disposed between the first valve member 96 and the bottom plate 78 along the vertical direction and inside the second spring 112. The first spring 118 biases the first valve member 96 upwardly, i.e., in a first valve-closing direction. Here, the first spring 118 corresponds to "first biasing member" herein.

The fluid passage 94 of the flow control valve 38 is connected to the first section 31a near the fuel tank 15 and to the second section 31b near the canister 34. That is, the first passage 87 is connected to a downstream end of the first section 31a of the fuel vapor pipe 31, whereas, the second passage 88 is connected to an upstream end of the second section 31b of the fuel vapor pipe 31. The valve housing 70 is generally fixed on a body of the vehicle by bolts or the like (not shown).

Figure 8:
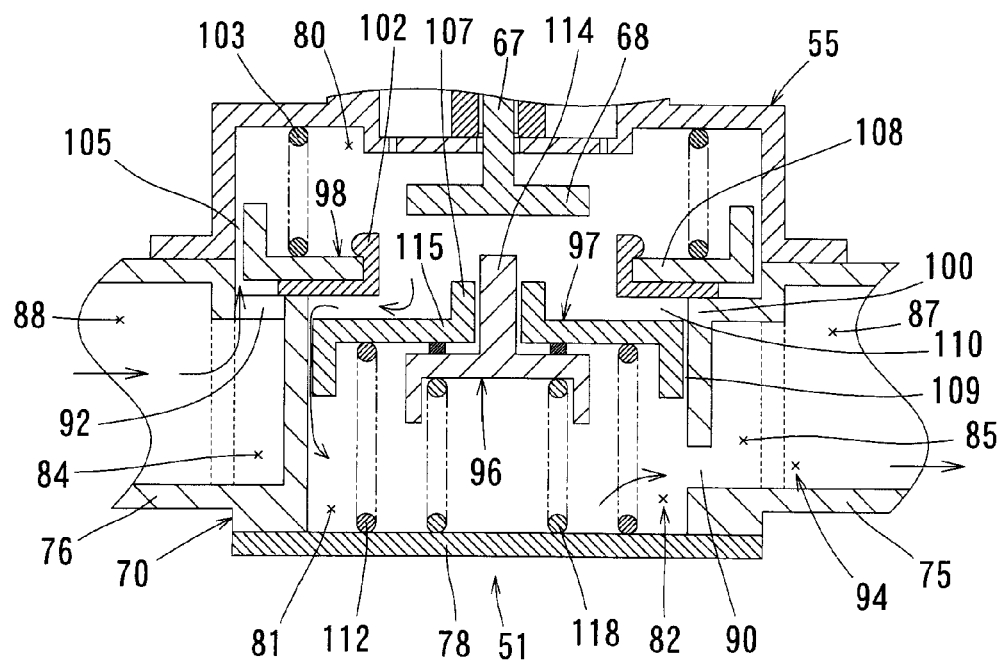
FIG. 8 is a cross-sectional view of the valve mechanical part where the second valve member is opened due to the differential pressure between the internal pressures of the first passage and the second passage.

Then, movements of the flow control valve 38 will be described. FIG. 5 is a cross-sectional view of the flow control valve 38 where the first valve is open. FIG. 6 is a cross-sectional view of the flow control valve 38 where the second valve is open. FIG. 7 is a cross-sectional view of the valve mechanical part 51 of the flow control valve 38 where the third valve is opened due to differential pressure between the internal pressures of the first passage and the second passage. FIG. 8 is a cross-sectional view of the valve mechanical part 51 where the second valve is opened due to differential pressure between the internal pressures of the first passage and the second passage.

(1) The first, second and third valves are closed.

During parking, the first valve member 96, the second valve member 97 and the third valve member 98 of the flow control valve 38 are kept in their valve-closing positions (FIGS. 2 and 3). That is, the first valve member 96 is kept in the valve-closing position due to pressing force of the first spring 118. The second valve member 97 is kept in the valve-closing position due to pressing force of the second spring 112. The third valve member 98 is kept in the valve-closing position due to pressing force of the third spring 103. Here, the closing direction for the first valve member 96 is opposite to the closing direction for the third valve member 93. The press shaft 67 of the step motor 53 is kept at a retracted position (upper position) such that the press plate 68 of the press shaft 67 is positioned away from the first protruding shaft 114 of the first valve member 96 and the second protruding shaft 107 of the second valve member 97. Accordingly, in the fuel vapor treating system 12 (FIG. 1), the fuel vapor vaporized in the fuel tank 15 does not flow into the canister 34 through the fuel vapor pipe 31, and air in the canister 34 does not flow into the fuel tank 15. Movements of the flow control valve 38 in a condition that the first, second and third valves are closed and that internal pressure P1 of the first passage 87 is higher or lower than internal pressure P2 of the second passage 88 by more than a predetermined value will be described later.

(2) The first valve is open, whereas the second and third valves are closed.

While the vehicle is moving, in order to flow the small amount of the fuel vapor from the fuel tank 15 to the canister 34 through the fuel vapor pipe 31, the ECU 45 outputs a first opening signal to the step motor 53 of the fuel control valve 38 for rotating the rotor 61 in a valve-opening direction such that press shaft 67 is moved from the retracted position (upper position) to a first advance position (lower position) (FIG. 5). Thus, the press plate 68 of the press shaft 67 presses the first protruding shaft 114 and thus moves the first valve member 96 downwardly against the pressing force by the first spring 118. Accordingly, the first valve is opened (i.e., the first valve member 96 is displaced away from the first valve seat 115), so that the inner space 81 of the valve housing 70 is communicated with the inner space 80 of the connection housing 55 via the first communication passage 116. In this state, the press plate 68 of the press shaft 67 is positioned away from the second protruding shaft 107 of the second valve member 97 at a predetermined distance.

Thus, the fuel vapor from the first passage 87 of the valve housing 70 flows to the second passage 88 through the right space 85, the right opening 90, the inner space 81 of the valve housing 70, the first communication passage 116, a space between the press plate 68 and the second protruding shaft 107 of the second valve member 97, the inner space 80 of the connection housing 55, the third flow passage 105, the left opening 92 and the left space 84 (refer to arrows in FIG. 5). The flow rate of the fuel vapor is dependent on a passage area of the first communication passage 116, which is opened and closed by the first valve member 96, in detail, on the smallest passage area in the first communication passage 116. For example, in this embodiment, a passage area between the first protruding shaft 114 of the first valve member 96 and the second protruding shaft 107 of the second valve member 97, in particular, between an outer surface of the first protruding shaft 114 and an inner surface of the second protruding shaft 107 is designed to be smaller than a passage area between the first valve member 96 and the second valve member 97 in the vertical direction, in particular, between the upper surface of the first valve member 96 and the lower surface of the second valve member 97. Accordingly, the flow rate of the fuel vapor is dependent on the passage area between the first and second protruding shafts 114, 107. Here, in this embodiment, the passage area of the first communication passage 116 is smaller than a passage area between the press plate 68 and the second protruding shaft 107 of the second valve member 97 and a passage area of the third flow passage 105.

(3) The first and second valves are open, whereas the third valve is closed.

During driving or refueling, in order to flow the large amount of the fuel vapor from the fuel tank 15 to the canister 34 through the fuel vapor pipe 31, the ECU 45 outputs a second opening signal to the step motor 53 of the flow control valve 38 for further rotating the rotor 61 in the valve-opening direction such that the press shaft 67 is moved to a second advance position below the first advance position (FIG. 6). Therefore, the press plate 68 of the press shaft 67 presses the second protruding shaft 107 of the second valve member 97 while pressing the first protruding shaft 114 of the first valve member 96 and thus moves the first and second valve members 96 and 97 downwardly against pressing force by the first and second springs 118 and 112. Accordingly, the second valve is opened, i.e., the second valve member 97 is displaced away from the second valve seat 108, so that the inner space 81 of the valve housing 70 is communicated with the inner space 80 of the connection housing 55 via the second communication passage 110.

Thus, the fuel vapor from the first passage 87 of the valve housing 70 flows to the second passage 88 through the right space 85, the right opening 90, the inner space 81 of the valve housing 70, the second flow passage 109, the second communication passage 110, the inner space 80 of the connection housing 55, the third flow passage 105, the left opening 92 and the left space 84 (refer to arrows in FIG. 6). In this state, the flow rate of the fuel vapor is dependent on a passage area of the second communication passage 110, which is opened and closed by the second valve member 97, in detail, on the smallest passage area in the second communication passage 110. For example, in this embodiment, because the press plate 68 protrudes into the second communication passage 110, a passage area radially defined between the third valve member 98 and either the press plate 68 or the second valve member 97 is designed to be smaller than a passage area axially defined between the second valve member 97 and the third valve member 98. Accordingly, the flow rate of the fuel vapor is dependent on the passage area radially defined between the second and third valve members 97 and 98. Here, the passage area of the second communication passage 110 is smaller than those of the second flow passage 109 and the third flow passage 105.

When the opening area of the first communication passage 116, which is opened and closed by the first valve member 96, is defined as A, and the opening area of the second communication passage 110, which is opened and closed by the second valve member 97, is defined as B, the opening area A and the opening area B are determined based on a following formula; A<B. Therefore, the first valve member 96 is used for controlling the smaller flow rate, whereas the second valve member 97 is used for controlling the large flow rate. For example, the larger flow rate is designed to be at least twice the smaller flow rate.

In the state that the first and second valve are open (FIG. 6), when the ECU 45 outputs a closing signal to the step motor 53 of the flow control valve 38, the rotor 61 is rotated in a valve-closing direction (i.e., a reverse direction relative to the valve-opening direction), and the press shaft 67 is retracted (moved upwardly). Accordingly, the second valve is closed due to action of the second spring 112, i.e., the second valve member 97 is pressed against the second valve seat 108 (FIG. 5). And then, the first valve is closed due to action of the first spring 118, i.e., the first valve member 96 is pressed against the first valve seat 115 (FIGS. 2 and 3).

(4) While the first, second and third valves are closed, the internal pressure P1 of the first passage 87 becomes higher than the internal pressure P2 of the second passage 88 by more than a predetermined value.

A case that the internal pressure P1 of the first passage 87 (pressure on the fuel tank 15 side) becomes higher than the internal pressure P2 of the second passage 88 (pressure on the canister 34 side) by more than a predetermined value Pα in the state that all valves are closed, i.e., during parking (FIGS. 2 and 3) will be described. In this state, difference pressure Pa is defined by difference between the internal pressure P1 and the internal pressure P2 (in detail, Pa=P1−P2), and the predetermined value Pα is lower than the differential pressure Pa (Pα<Pa).

In this case, the third valve member 98 is displaced away from the third valve seat 100 against the pressing force by the third spring 103 due to the differential pressure Pa that is higher than the predetermined value Pα (FIG. 7). Thus, the radially inner space and the radially outer space in the inner space 80 of the connection housing 55 are communicated with each other via the third communication passage 101. Accordingly, the internal pressure P1 is released to the second passage 88, so that it is able to control the differential pressure Pa between the internal pressure P1 and the internal pressure P2 below the predetermined value Pα. That is, the third valve member 98 works as a forward relief valve that opens when the internal pressure P1 becomes higher than the internal pressure P2 by more than the predetermined value Pα. When the differential pressure Pa decrease below the predetermined value Pα, the third valve member 98 is pressed against the third valve seat 100 due to the pressing force by the third spring 103, i.e., the third valve is closed (FIG. 3).

(5) While the first, second and third valves are closed, the internal pressure P1 of the first passage 87 becomes lower than the internal pressure P2 of the second passage 88 by more than a predetermined value.

A case that the internal pressure P1 of the first passage 87 (pressure on the fuel tank 15 side) becomes lower than the internal pressure P2 of the second passage 88 (pressure on the canister 34 side) by more than a predetermined value PP while all valves are closed, i.e., during parking (FIG. 2) will be described. In this condition, differential pressure Pb is defined by difference between the internal pressure P1 and the internal pressure P2 (in detail, Pb=P2−P1), and the predetermined value Pβ is lower than the differential pressure Pb (Pβ<Pb).

In this case, the second valve member 97 is displaced away from the second valve seat 108 against the pressing force by the second spring 112 due to the differential pressure Pb that is higher than the predetermined value Pβ (FIG. 8). Simultaneously, the first valve member 96 is moved downwardly by the second valve member 97 against the pressing force by the first spring 118. Thus, the inner space 80 of the connection housing 55 and the inner space 81 of the valve housing 70 are communicated with each other via the second communication passage 110. Accordingly, the internal pressure P2 is released into the first passage 87, so that it is able to control the differential pressure Pb between the internal pressure P1 and the internal, pressure P2 below the predetermined value Pβ. That is, the second valve member 97 works as a reverse relief valve that opens when the internal pressure P1 becomes lower than the internal pressure P2 by more than the predetermined value Pβ. Here, when the differential pressure Pb decreases below the predetermined value Pβ, the second valve member 97 is pressed against the second valve seat 108 due to the pressing force by the second spring 112, i.e., the second valve is closed, and the first valve member 96 is moved upwardly due to the pressing force by the first spring 118 (FIG. 3).

In the flow control valve 38, the press plate 68 of the step motor 53 (refer to FIG. 1) moves the first valve member 96 and the second valve member 97 in stages, i.e., the first valve and the second valve are sequentially opened (FIGS. 5 and 6). Therefore, it is able to improve control accuracy of the flow rate compared with the conventional electromagnetic valve.

In addition, when the internal pressure P1 of the first passage 87 becomes higher than the internal pressure P2 by more than the predetermined value Pα, the third valve is opened against the pressing force by the third spring 103. Accordingly, it is able to keep the differential pressure Pa between the internal pressure P1 of the first passage 87 and the internal pressure P2 of the second passage 88 below the predetermined value Pα (FIG. 7).

When the internal pressure P1 of the first passage 87 becomes lower than the internal pressure P2 of the second passage 88 by more than the predetermined value Pβ, the second valve is opened against the pressing force by the second spring 112. Accordingly, it is able to keep the differential pressure Pb between the internal pressure P1 of the first passage 87 and the internal pressure P2 of the second passage 88 below the predetermined value Pβ (FIG. 8). Here, it can be configured that the first valve opens in addition to opening of the second valve or that the first valve opens instead of the second valve.

The passage area of the first communication passage 116 that is opened and closed by the first valve member 96 (FIG. 5) is designed to be smaller than the passage area of the second communication passage 110 that is opened and closed by the second valve member 97 (FIG. 6). Accordingly, it is able to control a low flow rate by use of the first valve member 96 and to control a high flow rate by use of the second valve member 97.

The first communication passage 116 is defined between the first valve member 96 and the second valve member 97 and is configured to be opened and closed by the first valve member 96 (FIG. 5), and the second communication passage 110 is defined between the second valve member 97 and the third valve member 98 (including the seal member 102) and is configured to be opened and closed by the second valve member 97 (FIG. 6). Accordingly, such structure allows for compact arrangement of the first valve member 96, the second valve member 97 and the third valve member 98. Therefore, it is able to decrease the size and the weight of the flow control valve 38.

In addition, it is able to provide the fuel vapor treating system 12 with the flow control valve 38 (FIG. 2) having improved control accuracy of the flow rate and capable of controlling the differential pressures Pa, Pb between the internal pressure P1 of the first passage 87 and the internal pressure P2 of the second passage 88 below the predetermined values Pα, Pβ. Because the flow rate of the fuel vapor flowing through the fuel vapor pipe 31 can be controlled with high accuracy during purge operation for the fuel vapor, it is able to reduce disturbance of air-fuel ratio (A/F). The third valve member 98 works as the forward relief valve and the second valve member 97 works as the reverse relief valve, so that it is able to downsize the fuel vapor treating system 12 compared with, for example, the conventional system having a forward relief valve and a reverse relief valve provided in a bypass pathway for bypassing the fuel control valve. Here, the second valve member 97 works as the reverse relief valve in this embodiment, however if not necessary, the second valve member 97 may be configured not to work as the reverse relief valve.

Figure 9:
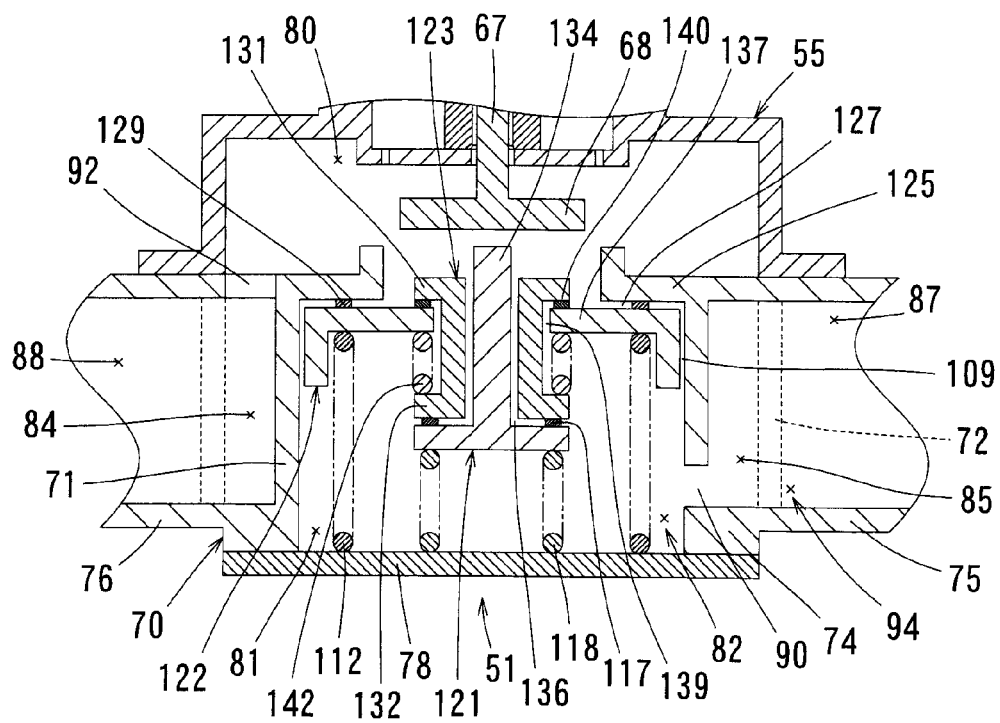
FIG. 9 is a cross-sectional view of a valve mechanical part of a flow vapor treating system in a second embodiment.

A second embodiment will be described. This embodiment substantially corresponds to the first embodiment further having some changes, so that the changes will be described and the substantial same structures will not be explained. FIG. 9 is a cross-sectional view of the mechanical part of the flow control valve of the second embodiment. As shown in FIG. 9, a third valve member 123 is disposed between a first valve member 121 and a second valve member 122. That is, this embodiment does not include the third valve member 98 and the third spring 103 of the first embodiment (FIG. 3). The upper end of the inner cylinder 71 of the valve housing 70 has a ring-shaped partition 125 that is formed in a flange shape. The partition 125 works as a second valve seat 125 (labeled with the same number as the partition) for the second valve member 122 such that the second valve member 122 fit the second valve seat 125, i.e., the second valve is composed of the second valve member 122 and the second valve seat 125 in the second embodiment.

When the second valve member 122 is displaced away from the second valve seat 125 (the second valve is open), a second communication passage 127 defined between the second valve member 122 and the partition 125 is opened. The second communication passage 127 communicates the inner space 81 of the valve housing 70 with the inner space 80 of the connection housing 55 and is closed by the second valve member 122.

A ring-shaped second seal member 129 is concentrically mounted on an upper surface of the second valve member 122. When the second valve member 122 contacts the second valve seat 125 (the second valve is closed), the second seal member 129 of the second valve member 122 elastically contacts the second valve seat 125 in order to tightly close the second communication passage 127 between the second valve member 122 and the second valve seat 125. The second valve member 122 of this embodiment concentrically has an opening at its center region instead of the radially inner part including the second protruding shaft 107 in the second valve member 122 of the first embodiment.

The third valve member 123 is formed in a hollow cylinder shape and has flange portions 131, 132 extending radially outward from either top or bottom end of the third valve member 123. A first protruding shaft 134 protruding upwardly from the first valve member 121 is loosely fitted into the third valve member 123 such that the third valve member 123 can move relative to the first valve member 121 in the vertical direction. The lower flange portion 132 works as a first valve seat 132 (labeled with the same number as the lower flange portion 132) for the first valve member 121 such that the first valve member 121 fits the first valve seat 132, i.e., the first valve is composed of the first valve member 121 and the first valve seat 132 in this embodiment.

When the first valve member 121 is displaced away from the first valve seat 132 (the first valve is open), a first communication passage 136 defined between the first valve member 121 and the third valve member 123 is opened. The first communication passage 136 communicates the inner space 81 of the valve housing 70 with the inner space 80 of the connection housing 55 and is closed by the first valve member 121. The first protruding shaft 134 is designed to protrude above the third valve member 123 in the state that the first valve is closed. In this state, a first seal member 117 attached to the upper surface of the first valve member 121 elastically contacts the first valve seat 132 in order to tightly close the first communication passage 136 between the first valve member 121 and the first valve seat 132.

The radially inner part of the second valve member 122 works as a third valve seat 137 for the third valve member 123 such that the upper flange portion 131 of the third valve member 123 fits an upper surface of the third valve seat 137, i.e., the third valve is composed of the third valve member 123 including the upper flange portion 131 and the third valve seat 137 in this embodiment. When the upper flange 131 of the third valve member 123 is displaced away from the third valve seat 137 (the third valve is open), a third communication passage 139 defined between the second valve member 122 and the third valve member 123 is opened. The third communication passage 139 communicates the inner space 81 of the valve housing 70 with the inner space 80 of the connection housing 55 and is closed by the third valve member 123.

The upper flange portion 131 concentrically has a ring-shaped third seal member 140 on its lower surface. When the third valve member 123 contacts the third valve seat 137, the third seal member 140 elastically contacts the third valve seat 137 in order to tightly close the third communication passage 139 between the upper flange portion 131 and the third valve seat 137. A third spring 142 that is composed of a coil spring is disposed between the lower flange portion 132 of the third valve member 123 and the radially inner part of the second valve member 122 along the vertical direction. The third spring 142 biases the third valve member 123 downwardly, i.e., in a third valve-closing direction. Here, the third spring 142 corresponds to "third biasing member" herein.

In this embodiment, when the press plate 68 of the step motor 53 presses and moves downwardly the first protruding shaft 134 against the pressing force from the first spring 134, the first valve member 121 is displaced away from the first valve seat 132, i.e., the first valve is opened. And, when the press plate 68 of the step motor 53 presses and moves downwardly the upper flange portion 131 of the third valve member 123 together with the second valve member 122 against the pressing force from the second spring 112, the second valve member 122 is displaced away from the second valve seat 125, i.e., the second valve is opened.

During parking (in a state that the first, second and third valves are closed), when the internal pressure P1 becomes higher than the internal pressure P2 of the second passage 88 by more than the predetermined value Pα, the third valve is opened against the pressing force from the third spring 142 due to the differential pressure Pa between the internal pressure P1 and the internal pressure P2, which is higher than the predetermined value Pα. Thus, the inner space 81 of the valve housing 70 and the inner space 80 of the connection housing 55 are communicated with each other via the third communication passage 139. Accordingly, the internal pressure P1 is released to the second passage 88, so that it is able to control the differential pressure Pa between the internal pressure P1 and the internal pressure P2 below the predetermined value Pα. When the differential pressure Pa becomes below the predetermined value Pα, the third valve member 123 is pressed against the third valve seat 137 due to the pressing force from the third spring 142, i.e., the third valve is closed.

During parking (in the state that the first, second and third valves are closed), when the internal pressure P1 of the first passage 87 becomes lower than the internal pressure P2 of the second passage 88 by more than the predetermined value Pβ, the second valve member 122 is displaced away from the second valve seat 125 against the pressing force from the second spring 112 due to the differential pressure Pb between the internal pressure P1 and the internal pressure P2, which is higher than the predetermined value 113, i.e., the second valve is opened. Thus, the inner space 80 of the connection housing 55 and the inner space 81 of the valve housing 70 are communicated with each other via the second communication passage 127. Accordingly, the internal pressure P2 is released to the first passage 87, so that it is able to control the differential pressure Pb between the internal pressure P1 and the internal pressure P2 below the predetermined value Pβ. When the differential pressure Pb becomes below the predetermined value Pβ, the second valve member 122 is pressed against the second valve seat 125 due to the pressing force from the second spring 112, i.e., the second valve is closed.

In the second embodiment, the first communication passage 136 that is closed by the first valve member 121 is defined between the first valve member 121 and the third valve member 123, and the third communication passage 139 that is closed by the third valve member 123 is defined between the second valve member 122 and the third valve member 123. Accordingly, such structure allows for compact arrangement of the first valve member 121, the second valve member 122 and the third valve member 123. Therefore, it is able to decrease the size and the weight of the flow control valve 38.

Figure 10:
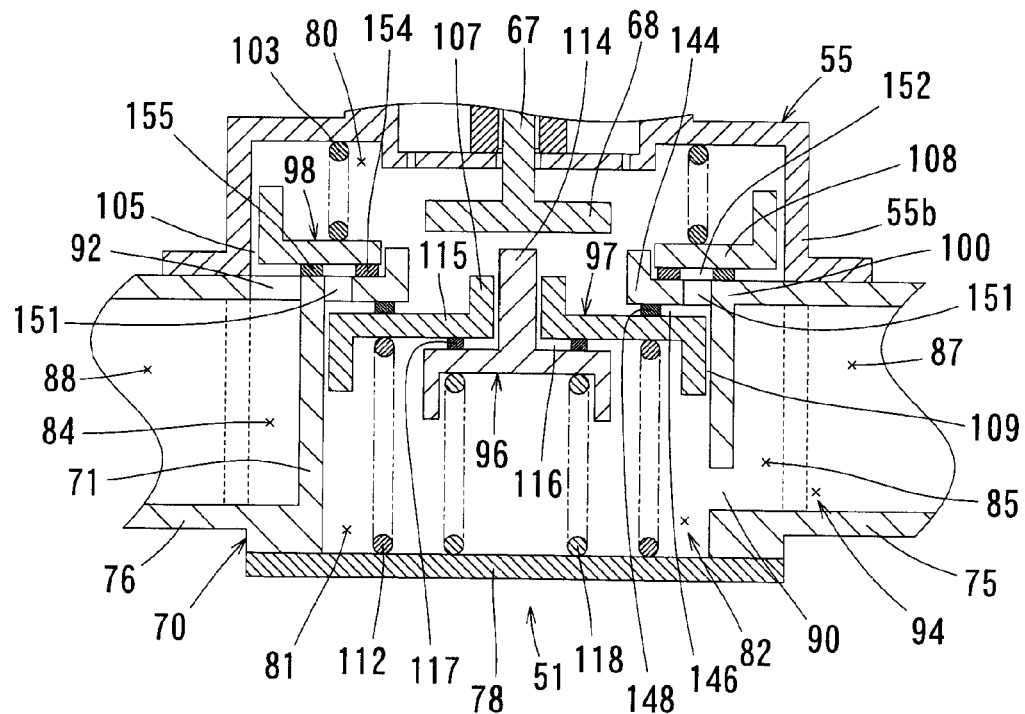
FIG. 10 is a cross-sectional view of a valve mechanical part of a flow vapor treating system in a third embodiment.

A third embodiment will be described. The third embodiment substantially corresponds to the first embodiment further having some changes, so that the changes will be described and the substantial same structures will not be described. FIG. 10 is a cross-sectional view of the valve mechanical part of the flow control valve in the third embodiment. As shown in FIG. 10, this embodiment does not include the seal member 102 of the third valve member 98 in the first embodiment. The upper end of the inner cylinder 71 of the valve housing 70 in this embodiment has a ring-shaped partition 144 that is formed as flange protruding upwardly from the upper surface of the upper end. The partition 144 works as a second valve seat 144 (labeled with the same number as the partition 144) for the second valve member 97 such that the second valve member 97 fits the second valve seat 144, i.e., the second valve is composed of the second valve member 97 and the second valve seat 144 in this embodiment.

When the second valve member 97 is displaced away from the second valve seat 144 (the second valve is open), a second communication passage 146 defined between the second valve member 97 and the partition 144 is opened. The second communication passage 146 is configured to be closed by the second valve member 97 and communicates with the second flow passage 109 in order to communicate the inner space 81 of the valve housing 70 with the inner space 80 of the connection housing 55. The second valve member 97 has a ring-shaped second seal member 148 concentrically attached to its upper surface. When the second valve member 97 contacts the second valve seat 144 (the second valve is closed), the second seal member 148 elastically contacts the second valve seat 144 in order to tightly close the second communication passage 146 between the second valve seat 144 and the second valve member 97.

The partition 144 works as a third valve seat 144 (labeled with the same number as the partition 144) for the third valve member 98 such that the third valve member 98 fits the third valve seat 144, i.e., the third valve is composed of the third valve member 98 and the third valve seat 144 in this embodiment. The partition 144 defines a plurality of holes 151 passing therethrough in the vertical direction. When the third valve member 98 is displaced away from the valve seat 144 (the third valve is open), a third communication passage 152 (including the holes 151) between the third valve member 98 and the partition 144 is opened. The third communication passage 152 (including the holes 151) communicates the radially inner space and the radially outer space in the inner space 80 of the connection housing 55 and is closed by the third valve member 98.

The third valve member 98 is provided with third seal members 154 and 155 each formed in a ring shape on its lower surface such that the smaller third seal member 154 is concentrically positioned inside the larger third seal member 155. The third seal members 154, 155 are arranged such that the holes 151 are positioned between the third seal members 154 and 155. When the third valve member 98 contacts the third valve seat 144 (the third valve is closed), the third seal members 154, 155 elastically contact the third valve seat 144 in order to tightly close the third communication passage 152 between the third valve member 98 and the third valve seat 144.

In this embodiment, during parking (the first, second and third valves are closed), when the internal pressure P1 of the first passage 87 becomes higher than the internal pressure P2 of the second passage 88 by more than the predetermined value Pα, the third valve member 98 is displaced away from the third valve seat 144 against the pressing force from the third spring 103 due to the differential pressure Pa between the internal pressure P1 and the internal pressure P2, which is higher than the predetermined value Pα. Thus, the radially inner space and the radially outer space in the inner space 80 of the connection housing 55 are communicated with each other via the third communication passage 152 (including the holes 151), so that the first passage 87 are communicated with the second passage 88. Accordingly, because the internal pressure P1 is released to the second passage 88, it is able to control the differential pressure Pa between the internal pressure P1 and the internal pressure P2 below the predetermined value Pα. When the differential pressure Pa becomes below the predetermined value Pα, the third valve member 98 is pressed against the third valve seat 144 due to the pressing force by the third spring 103, i.e., the third valve is closed.

During parking (the first, second and third valves are closed), when the internal pressure P1 of the first passage 87 becomes lower than the internal pressure P2 of the second communication passage 88 by more than the predetermined value Pβ, the second valve member 97 is displaced away from the second valve seat 144 due to the differential pressure Pb between the internal pressure P1 and the internal pressure P2, which is more than the predetermined value Pβ, i.e., the second valve is opened. Thus, the inner space 80 of the connection housing 55 and the inner space 81 of the valve housing 70 are communicated with each other via the second communication passage 146. Accordingly, the internal pressure P2 is released to the first passage 87, so that it is able to control the differential pressure Pb between the internal pressure P1 and the internal pressure P2 below the predetermined value Pβ. When the differential pressure Pb becomes below the predetermined value Pβ, the second valve member 97 is pressed against the second valve seat 144 due to the pressing force by the second spring 112, i.e., the second valve is closed.

In the third embodiment, the second communication passage 146 that is closed by the second valve member 97 is defined between the second valve member 97 and the partition 144 of the valve housing 70, and the third communication passage 152 (including the holes 151) that is closed by the third valve member 98 is defined between the third valve member 98 and the partition 144 of the valve housing 70. Accordingly, such structure allows for compact arrangement of the second valve member 97 and the third valve member 98 in the valve housing 70. Therefore, it is able to decrease the size and the weight of the flow control valve 38.

Figure 11:
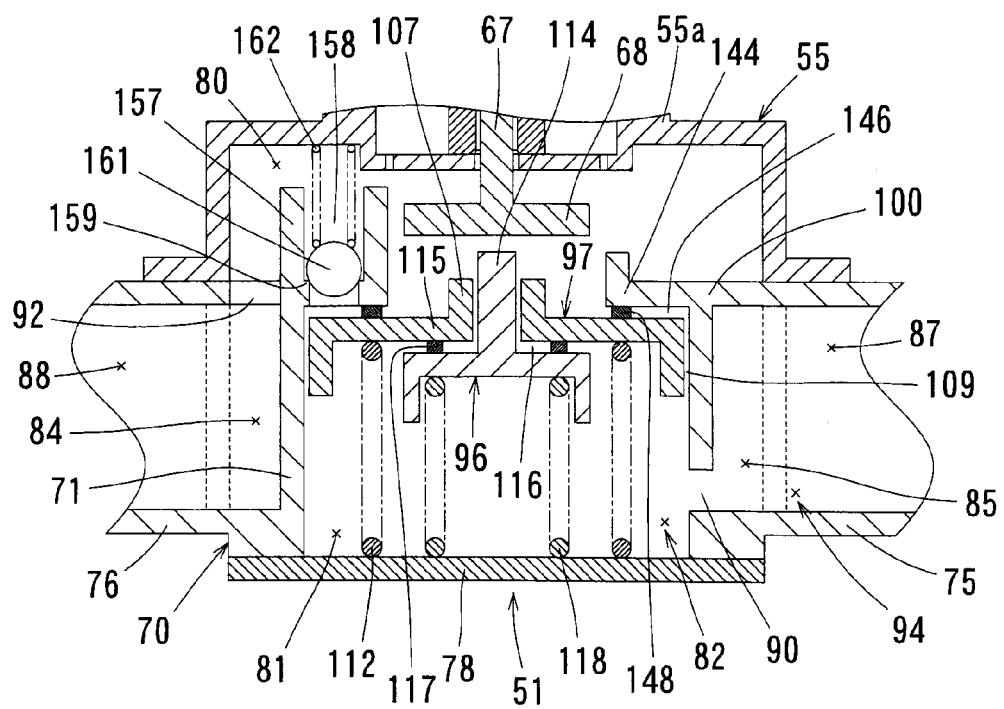
FIG. 11 is a cross-sectional view of a valve mechanical part of a flow vapor treating system in a fourth embodiment.

A fourth embodiment will be described. This embodiment substantially corresponds to the third embodiment further having some changes. Thus, the changes will be described and the substantial same structures will not be described. FIG. 11 is a cross-sectional view of the valve mechanical part of the flow control valve in the fourth embodiment. As shown in FIG. 11, this embodiment does not include the third valve member 98 and the third communication passage 152 of the third embodiment. The partition 144 has a cylinder portion 157 extending upwardly from a left inner end of the partition 144. The cylinder portion 157 defines therein a third communication passage 158 communicating the inner space 80 of the connection housing 55 and the inner space 81 of the valve housing 70. A ring-shaped third valve seat 159 is formed on an inner surface of a lower end of the cylinder portion 157. A third valve member 161 formed in a ball shape and fitting with the third valve seat 159 is loosely fitted into the cylinder portion 157. That is, the third valve member 161 is configured to close the third communication passage 158, i.e., the third valve is composed of the third valve member 161 and the third valve seat 159 in this embodiment. In addition, a third spring 162 is disposed between the third valve member 161 and the upper wall 55a of the connection housing 55 in the vertical direction. The third spring 162 biases the third valve member 162 downwardly, i.e., in a third valve-closing direction. Here, the third spring 162 corresponds to "third biasing member" herein.

In this embodiment, during parking (the first, second and third valves are closed), when the internal pressure P1 of the first passage 87 becomes higher than the internal pressure P2 of the second passage 88 by more than the predetermined value Pα, the third valve member 161 is displaced away from the third valve seat 159 against a pressing force by the third spring 162 due to the differential pressure Pa between the internal pressure P1 and the internal pressure P2, which is more than the predetermined value Pα, i.e., the third valve is opened. Thus, the inner space 81 of the valve housing 70 and the inner space 80 of the connection housing 55 are communicated with each other via the third communication passage 158. Accordingly, the internal pressure P1 is released to the second passage 88, so that it is able to control the differential pressure Pa between the internal pressure P1 and the internal pressure P2 below the predetermined value Pα. When the differential pressure Pa becomes below the predetermined value Pα, the third valve member 161 is pressed against the third valve seat 159 due to the pressing force by the third spring 162, i.e., the third valve is closed.

In accordance with the fourth embodiment, the second communication passage 146 that is closed by the second valve member 97 is defined between the partition 144 of the valve housing 70 and the second valve member 97, and the third communication passage 158 that is closed by the third valve member 161 is defined between the partition 144 of the valve housing 70 and the third valve member 161. Accordingly, such structure allows for compact arrangement of the second valve member 97 and the third valve member 161 in the valve housing 70. Therefore, it is able to decrease the size and the weight of the flow control valve 38.

Figure 12:
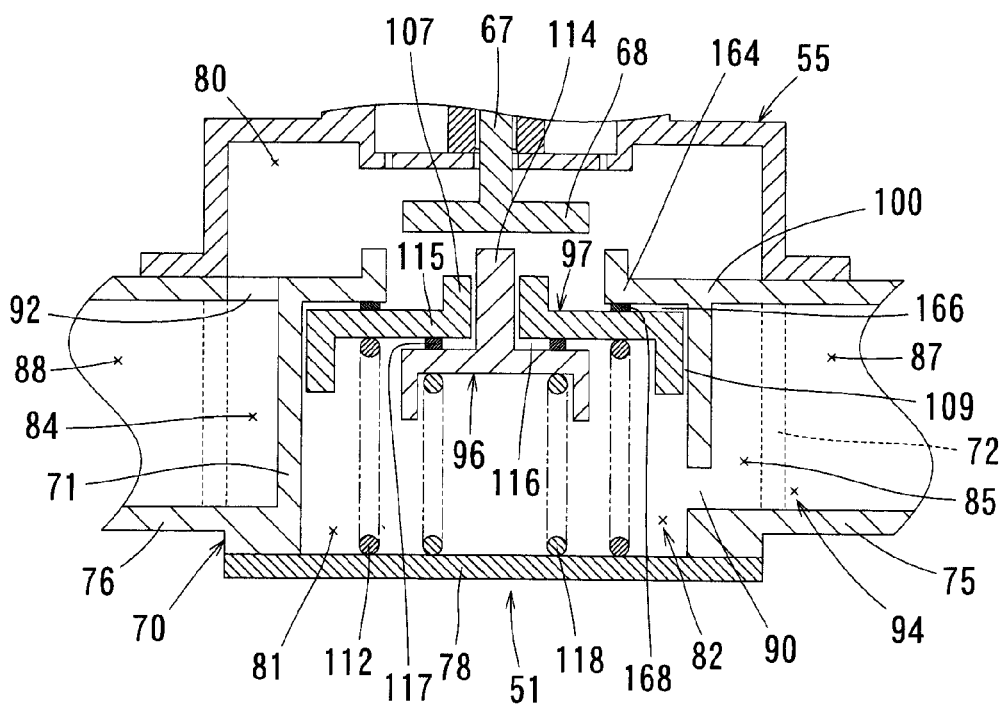
FIG. 12 is a cross-sectional view of a valve mechanical part of a flow vapor treating system in a fifth embodiment.
Figure 13:
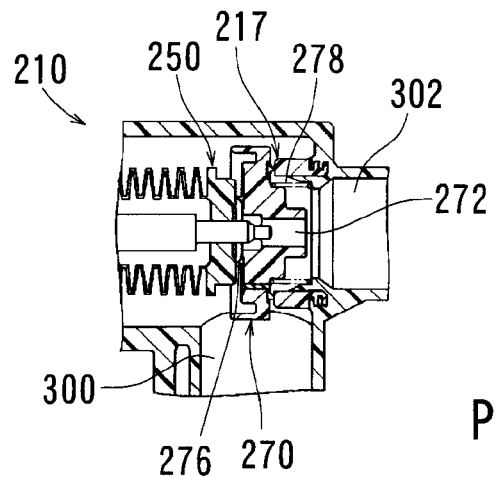
FIG. 13 is a cross-sectional view of a main part of a conventional electromagnetic valve.
Figure 14:
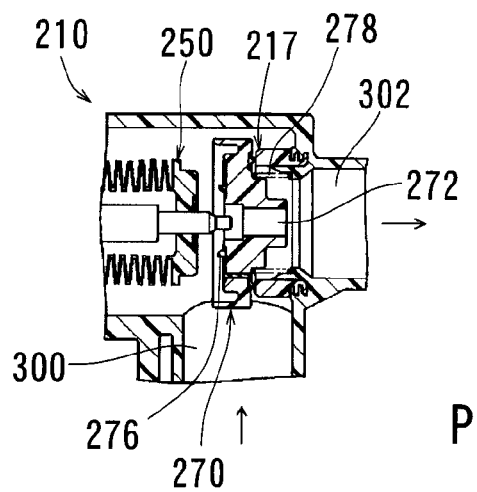
FIG. 14 is a cross-sectional view of the main part where a first valve member is open.
Figure 15:
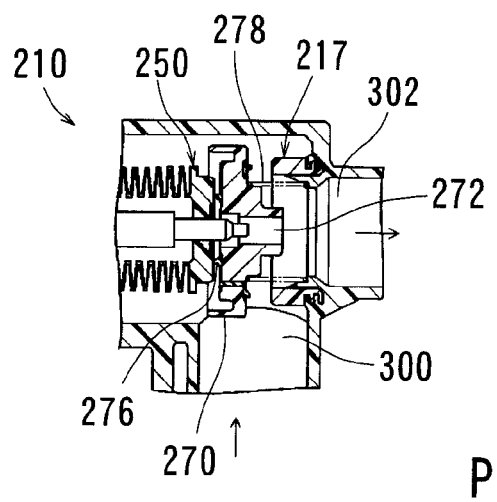
FIG. 15 is a cross-sectional view of the main part where a second valve member is open.

A fifth embodiment will be described. This embodiment substantially corresponds to the first embodiment further having some changes, so that the changes will be described and the substantial same structures will not be described. FIG. 12 is a cross-sectional view of the valve mechanical part of the flow control valve in the fifth embodiment. As shown in FIG. 12, this embodiment does not include the third valve member 98 and the third spring 103 of the first embodiment. The upper end of the inner cylinder 71 of the valve housing 70 has a ring-shaped partition 164 configured as a flange protruding upwardly from the upper end. The partition 164 works as a second valve seat 164 (labeled with the same number as the partition 164) for the second valve member 97 such that the second valve member 97 fits the second valve seat 164, i.e., the second valve is composed of the second valve member 97 and the second valve seat 164 in this embodiment.

When the second valve member 97 is displaced away from the second valve seat 164 (the second valve is open), a second communication passage 166 defined between the second valve member 97 and the partition 164 is opened. The second communication passage 166 is configured to be closed by the second valve member 97 and communicates with the second flow passage 109 in order to communicate the inner space 81 of the valve housing 70 and the inner space 80 of the connection housing 55 with each other. The second valve member 97 has a ring-shaped second seal member 168 concentrically attached to upper surface of the second valve member 97. When the second valve member 164 contacts the second valve seat 164 (the second valve is closed), the second seal member 168 elastically contacts the second valve seat 164 in order to tightly close the second communication passage 166 between the second valve seat 164 and the second valve member 97.

According to this embodiment, because the third valve member 98 working as the forward relief valve in the first embodiment can be eliminated, it is able to simplify the structure of the flow control valve.

The present teaching is not limited to the above-described embodiments. For example, the valve of this disclosure is not limited to the flow control valve 38 of the fuel vapor treating system 12 and can be applied to other devices.

This invention claims:

1. A valve comprising:
    a valve housing defining therein a fluid passage composed of a first passage and a second passage;
    a first valve member configured to open and close the fluid passage;
    a first biasing member pressing the first valve member in a first valve-closing direction along a flow direction from the first passage to the second passage;
    a second valve member configured to open and close the fluid passage;
    a second biasing member pressing the second valve member in a second valve-closing direction along the flow direction from the first passage to the second passage;
    an electromagnetic driving member having a pressing member configured to open the first valve member and the second valve member in stages;
    a third valve member configured to open and close the fluid passage; and
    a third biasing member pressing the third valve member in a third valve-closing direction along a flow direction from the second passage to the first passage;
    wherein the third valve member is configured to open the fluid passage when internal pressure of the first passage is higher than internal pressure of the second passage by more than a first predetermined value.

2. The valve according to claim 1, wherein at least one of the first valve member and the second valve member opens when the internal pressure of the first passage is lower than the internal pressure of the second passage by more than a second predetermined value.

3. The valve according to claim 1, wherein the fluid passage has a first passage area that is closed by the first valve member and a second passage area that is larger than the first passage are and is closed by the second valve member.

4. The valve according to claim 1, wherein the first valve member and the second valve member define therebetween a first communication passage that is opened and closed by the first valve member, and the second valve member and the third valve member define therebetween a second communication passage that is opened and closed by the second valve member.

5. The valve according to claim 1, wherein the first valve member and the third valve member define therebetween a first communication passage that is opened and closed by the first valve member, and the second valve member and the third valve member define therebetween a third communication passage that is opened and closed by the third valve member.

6. The valve according to claim 1, the valve housing and the second valve member define therebetween a second communication passage that is opened and closed by the second valve member, and the valve housing and the third valve member define therebetween a third communication passage that is opened and closed by the third valve member.

7. A fuel vapor treating system for a gas vehicle with a fuel tank comprising:
    an adsorbent canister;
    a fuel vapor pipe composed of a first pipe connected to the fuel tank and a second pipe connected to the adsorbent canister; and
    the valve according to claim 1 disposed between the first pipe and the second pipe,
    wherein the first pipe is connected to the first passage, and the second pipe is connected to the second passage.

* * * * *